3,320,525
IMPEDANCE BRIDGE MEASURING SYSTEM INCLUDING A SELF-OSCILLATORY LOOP BETWEEN THE BRIDGE INPUT AND OUTPUT
David E. Sunstein, Bala-Cynwyd, Pa., assignor, by mesne assignments, to Philco-Ford Corporation, a corporation of Delaware
Filed Mar. 16, 1953, Ser. No. 342,318
14 Claims. (Cl. 324—57)

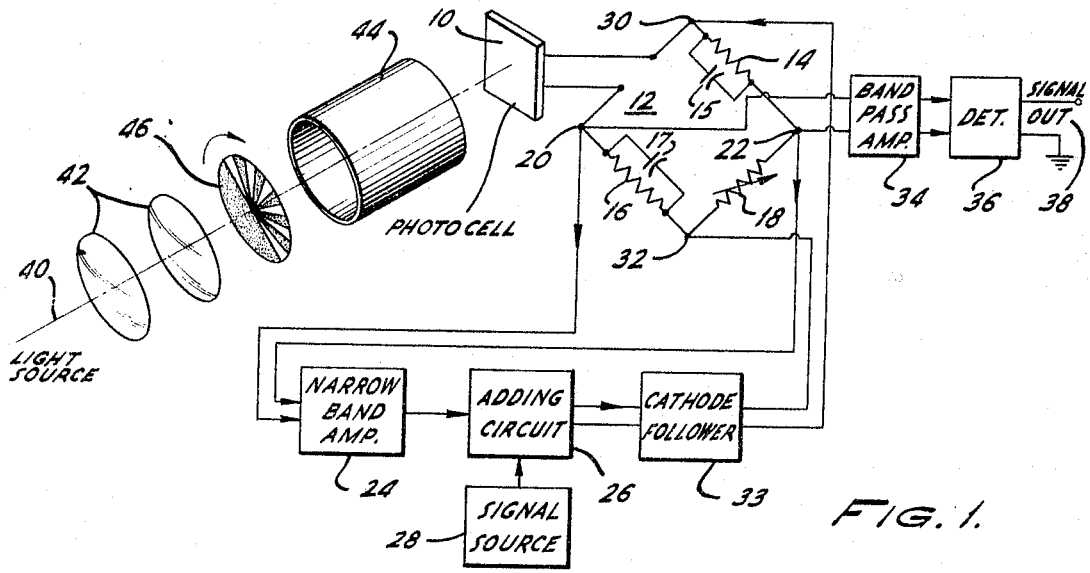
FIG. 1.
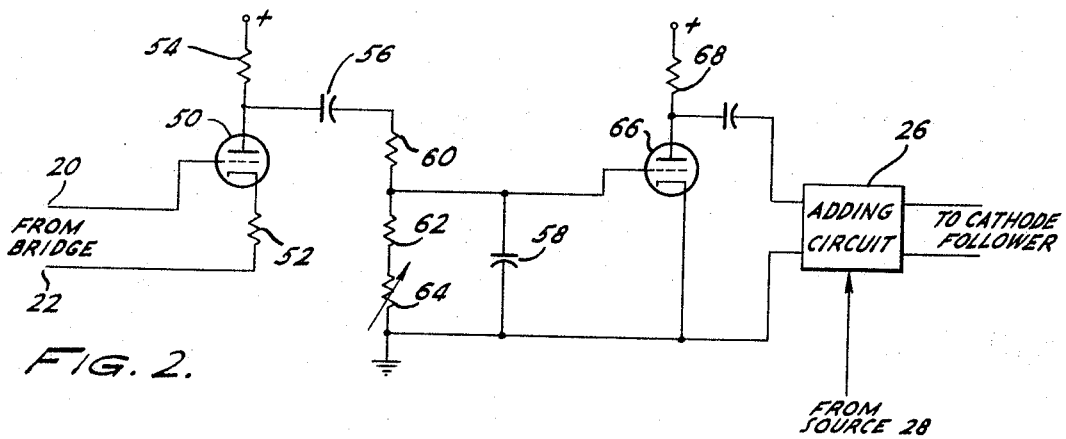
FIG. 2.
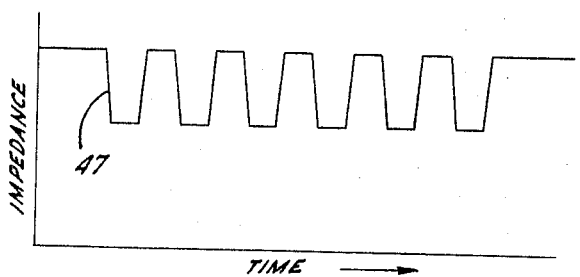
FIG. 3.
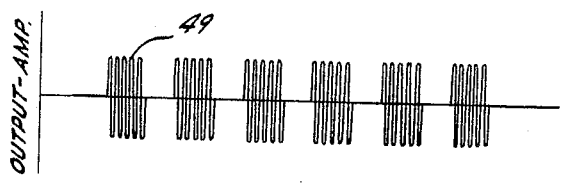
INVENTOR.
DAVID E. SUNSTEIN United States Patent Office 3,320,525
Patented May 16, 1967

The present invention relates to impedance measuring systems and more particularly to systems for measuring periodic changes of the order of a small fraction of a percent in the impedance of a circuit element.

In the field of electrical measurement it is frequently necessary to measure the periodic modulation or variation of impedance of a relatively high impedance circuit element. This variation may take place at a rate varying from several cycles per second to several thousand cycles per second and may vary in amplitude from a small fraction of one percent to several percent. In some instances it is desirable to indicate the amplitude of the variation in impedance on a meter or indicator provided for that purpose. In other instances it is advantageous to generate a signal of relatively high amplitude which is proportional to the amplitude of the variation in impedance and which may be applied to a suitable servo system for controlling a process, a machine, or the velocity or direction of movement of a vehicle.

For example, vehicle control systems have been developed which rely for directional information on the changes in the intensity of light falling on a photoconductive cell. To facilitate amplification and to provide sensing information, the light falling on the photocell is interrupted at an audio frequency rate, for example 2 kilocycles, by a rotating disc or "light chopper" having alternate, but not necessarily identical in size, transparent and opaque areas formed thereon. The term "audio frequency variation," as used throughout the specification and claims, refers to any variation lying generally in the range of frequencies below ten to twenty thousand cycles per second, but the limits of the frequency of variation are not critical and those mentioned should not be construed as limiting the scope or applicability of the invention. The amplitude of the signal from the photocell typically is of the order of a millivolt and, since the photocell impedance is high, it is impractical to provide a voltage step-up by transformer action. The amplification of a signal at this low level is made extremely difficult by the fact that electron tube amplifier stages are subject to the generation of microphonic signals of considerable amplitude. These microphonic signals have frequencies which lie generally in the audio frequency range and hence produce signals in the output of the amplifier stage which mask the designed signal from the photocell. For various reasons it may be impossible to raise the light chopping frequency to avoid these microphonic signals. For example, a higher chopping frequency would require a photocell having a shorter time constant which would result in a lower sensitivity of the circuit since the sensitivity of a photocell is inversely proportional to its time constant.

A similar problem of amplifying a low level signal arises in the measurement of vibrations in a member by means of a high impedance strain gauge secured thereto. In this instance, the mechanical vibration of the object under test provides the frequency variation in the output signal. Since the vibration frequency is a characteristic of the member under test, it is not a parameter that can be readily changed to facilitate the design of the amplifier stage.

One method of avoiding the effects of microphonic signals, in the amplifier stages which necessarily follow the measuring element, is to apply a high frequency bias voltage to the photocell or other measuring element. The changes in impedance of the measuring element will then act to amplitude-modulate this bias signal at the audio frequency rate determined by the characteristics of the measuring system. The modulated signal may then be amplified in a band-pass amplifier stage tuned to the bias frequency. A signal corresponding to the audio frequency variation in impedance of the measuring element may be obtained by detecting the modulated signal after amplification. If the frequency of the bias signal is reasonably high—for example 100 killocycles or more—the detected signal will be substantially free from the effects of microphonic signals generated in the amplifier stages. However, the use of such a modulation system involves still other difficulties. At low light levels the impedance of a photocell will change only a small fraction of a percent under the influence of the light chopper. Changes in ambient temperature and other factors affecting the operation of the photocell, will produce much greater changes in impedance and hence much greater changes in the amplitude of the modulated output signal. Furthermore, the bias signal itself is subject to fluctuations in amplitude which are indistinguishable from modulation signals resulting from variations in the impedance of the element to be measured. While certain of these difficulties may be overcome through the use of conventional bridge circuits, still other difficulties remain which cause all prior circuits for measuring this small periodic variation in impedance unsatisfactory for accurate, unattended operation.

Therefore it is an object of the present invention to provide a novel system for measuring the periodic or short time modulation or variation of impedance of a high impedance circuit element.

Another object of the invention is to provide a system of measuring a small percentage fluctuation of a high impedance which avoids the effects of microphonic signals frequency encountered in signal amplifiers.

A further object of the invention is to provide a new and improved bridge circuit for measuring the fluctuating component of a high impedance.

A more particular object of the present invention is to provide a system for providing a signal indicative of the modulation of a light beam falling on a photo-conductive cell.

Other objects, features and advantages will become apparent as the description of the invention proceeds.

In general, the present invention operates in the following manner. The impedance to be measured is included as one element of a self-balancing bridge network. One pair of terminals of the bridge network are connected to the input terminals of a high gain amplifier. The output terminals of the amplifier are connected to the other pair of terminals of the bridge to form a regenerative loop. The bridge network contains a nonlinear current or voltage controlled impedance so that the system is self-oscillatory and self-balancing for slow changes in the impedance of the measuring element but not self-balancing during one period of the variation to be measured. In the preferred embodiment of the invention a second signal is supplied to the input terminals of the quasi-balanced bridge network and an output signal, derived from this second input signal, is detected and amplified to provide a signal proportional to the modulation or variations in the impedance of the measuring element. In another embodiment of the invention the amplitude of the self-oscillation is detected.

For a better understanding of the invention reference should now be made to the following detailed description which is to be read in conjunction with the accompanying drawings in which:

FIG. 1 is a schematic diagram, partially in block form, of a preferred embodiment of the invention;

FIG. 2 is a schematic diagram of an amplifier circuit which forms a part of the present invention; and FIG. 3 is a series of waveforms which illustrate the operation of the preferred embodiment of the invention shown in FIG. 1.

Turning now to FIG. 1, a photo-conductive cell 10 forms one arm of a four-terminal bridge network 12. Resistors 14 and 16 form the two arms of the bridge adjacent photocell 10, and a slow responding, current sensitive resistor 18 forms the fourth arm of the bridge. Resistors of this type are known in the art as thermistors or barretters, depending upon their construction and the direction in which the resistance changes in response to an increase in current through the resistor. Other types of slow acting current or voltage sensitive impedances may be employed. However, the use of thyrite resistors should be avoided since these resistors respond almost instantly to changes in current therethrough. Terminal 20 at the junction of photocell 10 and resistor 16, and terminal 22 at the junction of resistors 14 and 18, form the output terminals of the bridge. These output terminals are connected to the input of a narrow band amplifier 24. Resistors 14 and 16 are shunted by capacitors 15 and 17 for reasons which will be explained later. Amplifier 24 preferably has a narrow passband at a frequency above the audio range or, more generally, above the range at which microphonics or other noise phenomena may be encountered in the amplifier circuits and in photocell 10. The output of amplifier 24 is supplied to a linear adding circuit 26 which also receives a signal from a signal source 28. The signal supplied by source 28 has a frequency which is outside the passband of amplifier 24. For example, amplifier 24 may have a passband centered at approximately 300 kilocycles and sigal source 28 may supply a signal having a frequency of one megacycle. Adding circuit 26 combines the two signals supplied thereto in a linear manner so that both signals appear at the output without appreciable intermodulation. The output of circuit 26 is connected to terminals 30 and 32, which form the input terminals of bridge 12, through a cathode follower amplifier 33. Output terminals 20 and 22 are also connected to a band-pass amplifier 34 which has a passband centered at the frequency of signal source 28. The passband of amplifier 34 is made wide enough to pass the sideband components resulting from the modulation of the light falling on photocell 10. The output of amplifier 34 is supplied through a detector 36 to output terminals 38. Output terminals 38 may be connected to a suitable meter or a servo system for controlling the operation of some machine or process in accordance with the information supplied by photocell 10. The circuit shown in FIG. 1 measures only the modulation or variation in the impedance of photocell 10 resulting from a variation in the intensity of the light beam falling on this photocell. The particular means employed to modulate the light falling on photocell 10 will depend on the process or apparatus to be controlled and any convenient means may be selected without affecting the operation of the present invention provided that the frequency of modulation lies within the operating range of the invention.

Even though the means for producing the modulation of the light falls outside the scope of the present invention, one example of such a modulation system has been shown in FIG. 1 in order that the operation of the present invention may be more fully understood. Light from a suitable area in space is directed toward photocell 10 along an axis 40. Lenses 42 are inserted in the path of the light to focus an image, such as the boundary between a light and a dark object present in the selected area in space, on photocell 10. The presence of this boundary causes the light falling on the photocell to be modulated by light chopper 46 even though the axis of rotation of light chopper 46 coincides with axis 40. A light shield 44 is provided for preventing stray light from striking photocell 10 and thus masking the signal supplied by the light traveling along axis 40. A light interrupting device or "light chopper" 46 is disposed in the path of the light traveling toward photocell 10. Light chopper 46, shown in FIG. 1, is a disc having alternate opaque and transparent areas formed thereon. Light chopper 46 is rotated at a speed that will cause the light striking photocell 10 to be interrupted at a low audio frequency, for example 2 kilocycles.

The embodiment of the invention in FIG. 1 operates in the following manner. The circuit including bridge network 12, narrow band amplifier 24 and adding circuit 26 form a closed loop. This loop will oscillate provided the gain of amplifier 24 is greater than the attenuation of the signal passing through bridge 12 and provided that the phase of the signal appearing at output terminals 20 and 22 of bridge 12 bears the proper relationship to the phase of the signal supplied to input terminals 30 and 32. The condition of proper phase can be achieved by properly selecting the terminals to which the input leads to the amplifier 24 are connected. Current sensitive resistor 18 is selected to have an impedance which changes in the proper direction to cause the bridge 12 to approach balance as energy is added to resistor 18. Under these conditions, the amount of regenerative feedback through the bridge circuit decreases as the amplitude of oscillation increases so that the level of oscillation is controlled by the characteristics of resistor 18 rather than by limiting action in amplifier 24. The above-described circuit will oscillate at the frequency having the highest over-all gain around the loop. If the bridge 12 is composed of non-reactive elements, the frequency of oscillation will be determined primarily by the characteristics of narrow band amplifier 24. This frequency selectivity may be achieved through the use of tuned interstage coupling networks in amplifier 24 or through the use of frequency selective resistor-capacitor networks. An example of the latter circuits will be discussed in connection with the description of FIG. 2.

The amplitude of the oscillations in the circuit just described will increase until the impedance of resistor 18 is changed to the extent necessary to substantially balance bridge 12. When this condition is reached, the signal appearing at output terminals 20 and 22 of bridge 12 will be just sufficient to provide a signal at input terminals 30 and 32 which will maintain the proper operating current through resistor 18. If the gain of amplifier 24 is high, the signal required at terminals 20 and 22 to produce the necessary signal at terminals 30 and 32 will be very small indicating that the bridge is substantially balanced. If the frequency of self-oscillation is made very low—for example under one hundred cycles—the capacitors 15 and 17 may be omitted. However, at higher frequencies the distributed capacitance of resistors 14, 16 and 18 and photocell 10 generally are such that a precise balance cannot be obtained without shunting one or more arms of the bridge 12 with a reactive element of appropriate value to overcome the effect of the stray capacitance. The shunting reactances may be placed in any convenient arm of the bridge according to conventional bridge practice. By way of illustration, capacitors 15 and 17 are shown shunting resistors 14 and 16. The values of these capacitors may be computed from the known or measured values of the stray capacitance or the proper reactance to be inserted may be determined experimentally by observing the values that give the sharpest null as the bridge approaches balance. It can be shown that if the modulation of the impedance presented by photocell 10 as a result of the action of light chopper 46 is sufficiently small, for example less than 10%, and if the frequency of the modulation is sufficiently great so that resistor 18 will not respond due to the time lag in this element, then the oscillatory loop just described will not respond to the modulation of the photocell impedance but will balance at the average value of the photocell impedance determined by the average intensity of ilumination falling on the photocell 10 and the ambient temperature or other factors affecting the characteristics of photocell 10. The signal supplied by source 28 passes through adding circuit 26 and cathode follower 33 and appears at input terminals 30 and 32 of bridge 12. In the absence of any modulation of the light falling on photocell 10, the signal appearing at output terminals 20 and 22 of bridge 12 at the frequency of source 28 will be very small since the bridge is substantially at balance. However, when the light falling on photocell 10 is modulated by light chopper 46, the impedance of photocell 10 is correspondingly modulated, as shown at 47 in FIG. 3, but resistor 18 does not follow this modulation, and a substantial output signal shown at 49 in FIG. 3 is obtained at the input of amplifier 34 at the frequency of the signal supplied by signal source 28. The percentage modulation of this output signal is very much greater than the percentage modulation of the light falling on photocell 10. For this reason minor variations in the amplitude of the signal supplied by source 28 will have little effect and may be disregarded. This signal supplied to amplifier 34 is amplified therein and envelope-detected in circuit 36. The output signal at terminals 38 will correspond to the envelope of the signal supplied to amplifier 34 and will be proportional to the modulation of the impedance of photocell 10.

FIG. 2 shows a form of narrow band amplifier which may be employed in the present invention. Terminal 20 of bridge 12 is connected to the control grid of an amplifier tube 50. Terminal 22 is connected to the cathode of tube 50 through a resistor 52. The anode of tube 50 is returned to a source of anode supply potential through an anode load resistor 54. An output coupling network, comprising capacitors 56 and 58 and resistors 60, 62 and 64, connects the output of vacuum tube 50 to the cathode-grid circuit of vacuum tube 66. This series parallel coupling circuit is a modified Wien bridge circuit having a frequency of minimum attenuation determined by the relative values of the various elements making up the coupling network. Vacuum tube 66 is provided with the usual anode load impedance 68 and the output of vacuum tube 66 is supplied to adding circuit 26 which corresponds to the similarly numbered circuit in FIG. 1.

It will be obvious to one skilled in the art that the circuit shown in FIG. 1 will measure the variation or modulation of the impedance of any conductive circuit element connected between terminals 20 and 30 provided that this modulation takes place at a rate which is sufficiently high so that the self-oscillatory loop will not respond to such variations. It has been suggested above that a high impedance strain gauge element is one substitution that can be made. Other uses for the novel circuit of FIG. 1 will be apparent to those familiar with the art of electrical measurement.

As stated above, a self-oscillatory system of the type shown in FIG. 1 does not respond instantly to changes in impedance of photocell 10 or other measuring element occupying a corresponding position in the bridge network. If the impedance is changed rapidly from one constant value to a second constant value, the amplitude of self-oscillation will build up or decrease substantially exponentially to a new equilibrium value. If the percentage change of impedance is small and the frequency of variation is relatively low but still faster than the rate at which the self-oscillatory system can reach a new equilibrium condition, the amplitude of the self-oscillation appearing at the output terminals of the bridge 12 will be amplitude modulated at a rate corresponding to the modulation of the impedance of photocell 10. If the period of the modulation of the impedance of photocell 10 is not too large a fraction of the exponential build up time of the self-oscillation, the modulation envelope of the self-oscillation at the output terminals of the bridge network will bear a substantially linear relationship to the modulation of impedance of photocell 10. Therefore, if the modulation of the light falling on photocell 10 is modulated at the slow rate mentioned above, a somewhat simplified embodiment of the invention may be employed to detect this modulation. In this simplified embodiment of the invention, amplifier 34 is tuned to accept the frequency of self-oscillation and detector 36 detects the modulation envelope of the self-oscillation. In this embodiment signal source 28 and adding circuit 26 are not required and may be omitted. As explained above, the useful frequency range of this embodiment is limited. If the frequency of modulation of the impedance of photocell 10 is very low, the impedance of resistor 18 can follow the variation and the output of the bridge will be very low. If the frequency of modulation of the impedance of photocell 10 is too high, the amplitude of self-oscillation does not build up by a measurable amount during a period of the modulation of the impedance of photocell 10. However, between these limits the simplified embodiment operates very well and is simpler and less expensive to produce than the preferred embodiment of the invention.

The four arm, four terminal bridge circuit shown in the drawing has been found to give satisfactory results but other forms of bridge circuits which respond in the manner described above may be substituted therefor without departing from the scope of the invention. The use of mechanically controlled variable impedances which respond automatically to changes in voltage or current supplied thereto in place of resistor 18 also falls within the scope of the invention. Therefore, while I have described what is at present considered to be the preferred embodiment of the invention, it is recognized that certain changes and modifications may be made therein without departing from the spirit and scope of the hereinafter appended claims which define the scope of the invention.

What is claimed is:

1. Means for measuring the variation of impedance of a circuit element comprising an amplifier, a bridge network providing regenerative feedback between the output and the input of said amplifier, said circuit element forming at least a portion of one arm of said bridge network, said bridge network including a current sensitive element arranged to cause said bridge to assume a substantially balanced condition in the absence of a variation of impedance of said circuit element, said bridge being arranged to be unbalanced by variations in impedance of said circuit element, the rate of response of said current sensitive element being slow compared to the variation of impedance of said circuit element, a modulation envelope detector, and means connecting said detector to the output of said bridge network, the output of said detector being a signal indicative of the variation of impedance of said circuit element.

2. Means for measuring the variation of impedance of a circuit element comprising an amplifier, a bridge network having input and output terminals, said circuit element forming at least a portion of one arm of said bridge network, means connecting the input terminals of said bridge network to the output of said amplifier, means connecting the output terminals of said bridge network to the input terminals of said amplifier thereby to establish a self-oscillatory circuit including said amplifier and said bridge network, said bridge network including a current sensitive element arranged to cause said bridge to assume a substantially balanced condition in the absence of a relatively rapid variation of impedance of said circuit element, the rate of response of said current sensitive element being slow compared to the relatively rapid variation of impedance of said circuit element to be measured, said bridge thereby being arranged to be unbalanced for relatively rapid variations of impedance of said circuit element, a modulation envelope detector, and means connecting said detector to the output terminals of said bridge network, the output of said detector being a signal indicative of said relatively rapid variations of impedance of said circuit element.

3. Means for measuring the variation of impedance of a circuit element comprising an amplifier, a bridge network having input and output terminals, said circuit element forming at least a portion of one arm of said bridge network, means connecting the input terminals of said bridge network to the output of said amplifier, means connecting the output terminals of said bridge network to the input terminals of said amplifier thereby to establish a self-oscillatory circuit including said amplifier and said bridge network, said bridge network including a current sensitive element arranged to cause said bridge circuit to assume a substantially balanced condition in the absence of a relatively rapid variation of impedance of said circuit element, the rate of response of said current sensitive element being slow compared to the relatively rapid variation of impedance of said circuit element to be measured, said bridge thereby being arranged to be unbalanced for relatively rapid variations of impedance of said circuit element, means connected to the input terminals of said bridge network for supplying thereto a signal having a frequency displaced from the self-oscillation frequency of said self-oscillatory circuit, a modulation envelope detector and means connecting said detector to the output terminals of said bridge network, said last-mentioned means being arranged to block signals having a frequency equal to said self-oscillatory frequency, the output of said detector being a signal indicative of said rapid variation of impedance of said circuit element.

4. A circuit for measuring the fluctuating component of impedance of a circuit element, said measuring circuit comprising, a bridge network having two input terminals and two output terminals, means comprising at least said circuit element connected between one input terminal and one output terminal to form one arm of said bridge network, a current sensitive impedance connected between one input and one output terminal to form a second arm of said bridge network, and second and third impedances each connected between an input terminal and an output terminal to form, respectively, the third and fourth arms of said bridge network, an amplifier, means connecting the input of said amplifier to said output terminals of said bridge network, means connecting the output of said amplifier to said input terminals of said bridge network thereby to form a closed self-oscillatory loop, means included in said closed loop for restricting the frequency of oscillation of said loop to a predetermined frequency range, the characteristics of said current sensitive impedance being such that said bridge network approaches balance as the energy supplied to said input terminals thereof increases, said loop including means for limiting the rate at which said bridge approaches balance, means connected to said input terminals of said bridge network for supplying thereto a signal having a frequency outside said predetermined frequency range, detector means, and frequency selective means connecting said detector means to said output terminals of said bridge network, said frequency selective means being adapted to pass signals having frequencies approximately equal to the frequency of said signal supplied to said input terminals.

5. A circuit for measuring the fluctuating component of impedance of a circuit element, said measuring circuit comprising, a bridge network having two input terminals and two output terminals, means comprising at least said circuit element connected between one input terminal and one output terminal to form one arm of said bridge network, a current sensitive resistor connected between one input and one output terminal to form a second arm of said bridge network, and second and third resistors each connected between an input terminal and an output terminal of said bridge network to form, respectively, the third and fourth arms of said bridge network, an amplifier having a restricted passband, means connecting the input of said amplifier to said output terminals of said bridge network, means connecting the output of said amplifier to said input terminals of said bridge network thereby to form a closed self-oscillatory loop, the characteristics of said current sensitive resistor being such that said bridge network approaches balance as the energy supplied to the input terminals thereof increases, said loop including means for limiting the rate at which said bridge approaches balance, means connected to said input terminals of said bridge network for supplying thereto a signal having a frequency outside said restricted passband of said amplifier, detector means, and frequency selective means connecting said detector means to said output terminals of said bridge network, said frequency selective means being adapted to pass signals having frequencies approximately equal to the frequency of said signal supplied to said input terminals.

6. A circuit for measuring the fluctuating component of impedance of a circuit element, said measuring circuit comprising, a bridge network having two input terminals and two output terminals, means comprising at least said circuit element connected between one input terminal and one output terminal to form one arm of said bridge network, a current sensitive resistor connected between one input and one output terminal to form a second arm of said bridge network, and second and third resistors each connected between an input terminal and an output terminal of said bridge network to form, respectively, the third and fourth arms of said bridge network, an amplifier having a restricted passband, means connecting the input of said amplifier to said output terminals of said bridge network, means connecting the output of said amplifier to said input terminals of said bridge network thereby to form a closed self-oscillatory loop, the characteristics of said current sensitive resistor being such that said bridge network approaches balance as the energy supplied to the input terminals thereof increases, the rate of change of resistance of said current sensitive resistor being slow compared to the rate of change of impedance of said circuit element, means connected to said input terminals of said bridge network for supplying thereto a signal having a frequency outside said restricted passband of said amplifier, frequency selective means connected to said output terminals of said bridge network and arranged to pass only signals having frequencies approximately equal to the frequency of said signal supplied to said input terminals, and detector means associated with said frequency selective means and arranged to detect the modulation envelope of the signals passed thereby.

7. A circuit for measuring the fluctuating component of impedance of a circuit element, said measuring circuit comprising, a bridge network having two input terminals and two output terminals, means comprising at least said circuit element connected between one input terminal and one output terminal to form one arm of said bridge network, a current sensitive resistor connected between one input and one output terminal to form a second arm of said bridge network, and second and third resistors each connected between an input terminal and an output terminal of said bridge network to form, respectively, the third and fourth arms of said bridge network, said current sensitive resistor having a resistance such that said bridge network is normally unbalanced in the absence of a signal supplied thereto, said current sensitive resistor having a resistance-current characteristic such that said bridge network approaches balance as energy is supplied to said input terminals of said bridge network, the rate of change of resistance of said current sensitive resistor being slow compared to the rate of change of impedance of said circuit element, an amplifier having a restricted passband, means connecting the input of said amplifier to said output terminals of said bridge network, means connecting the output of said amplifier to said input terminals of said bridge network thereby to form a closed self-oscillatory loop, means connected to said input terminals of said bridge network for supplying thereto a signal having a frequency outside said restricted passband of said amplifier, frequency selective means connected to said output terminals of said bridge and arranged to pass only signals having frequencies approximately equal to the frequency of said signal supplied to said input terminals, and detector means associated with said frequency selective means and arranged to detect the modulation envelope of the signals passed thereby.

8. A circuit for measuring the fluctuating component of impedance of a circuit element, said measuring circuit comprising, a bridge network having first and second input terminals and first and second output terminals, means comprising at least said circuit element connected between said first input terminal and said first output terminal to form one arm of said bridge network, a current sensitive resistor connected between said second input terminal and said second output terminal to form a second arm of said bridge network, and second and third resistors connected, respectively, between said first input terminal and said second output terminal and said second input terminal and said first output terminal to form, respectively, the third and fourth arms of said bridge network, said current sensitive resistor having a resistance such that said bridge network is normally unbalanced in the absence of a signal supplied thereto, said current sensitive resistor having a resistance-current characteristic such that said bridge network approaches balance as energy is supplied to said input terminals, the rate of change of resistance of said current sensitive resistor being slow compared to the rate of change of impedance of said circuit element, an amplifier having a restricted passband, means connecting the input of said amplifier to said output terminals of said bridge network, means connecting the output of said amplifier to said input terminals of said bridge network thereby to form a closed self-oscillatory loop, means connected to said input terminals of said bridge network for supplying thereto a signal having a frequency outside said restricted passband of said amplifier, frequency selective means connected to said output terminals of said bridge and arranged to pass only signals having frequencies approximately equal to the frequency of said signal supplied to said input terminals, and detector means associated with said frequency selective means and arranged to detect the modulation envelope of the signals passed thereby.

9. A circuit for measuring the fluctuating component of impedance of a circuit element, said measuring circuit comprising, a bridge network having first and second input terminals and first and second output terminals, means comprising at least said circuit element connected between said first input terminal and said first output terminal to form one arm of said bridge network, a current sensitive resistor connected between said second input terminal and said second output terminal to form a second arm of said bridge network, and second and third resistors connected, respectively, between said first input terminal and said second output terminal and said second input terminal and said first output terminal to form, respectively, the third and fourth arms of said bridge network, said current sensitive resistor having a resistance such that said bridge network is normally unbalanced in the absence of a signal supplied thereto, said current sensitive resistor having a resistance-current characteristic such that said bridge network approaches balance as energy is supplied to said input terminals, the rate of change of resistance of said current sensitive resistor being slow compared to the rate of change of impedance of said circuit element, a first amplifier having a restricted passband, means connecting the input of said first amplifier to said output terminals of said bridge network, a signal adding circuit connected to the output of said amplifier, means connected to said adding circuit for supplying thereto a signal having a frequency outside the passband of said first amplifier, means connecting the output of said adding circuit to said input terminals of said bridge network thereby to form a closed, self-oscillatory loop, a second amplifier having a restricted passband, said second amplifier being connected to said output terminals of said bridge and arranged to pass only signals having frequencies corresponding to the frequency of said signal supplied to said adding circuit and modulation sidebands thereof resulting from the fluctuation of the impedance of said circuit element, and detector means connected to the output of said second amplifier and arranged to detect the modulation envelope of signals passed thereby.

10. A circuit for measuring the fluctuating component of impedance of a photo-conductive cell resulting from a relatively rapid fluctuation of the light supplied thereto, said measuring circuit comprising a bridge network having first and second input terminals and first and second output terminals, said photo-conductive cell being connected between said first input terminal and said first output terminal to form one arm of said bridge network, a current sensitive resistor connected between said second input terminal and said second output terminal to form a second arm of said bridge network, and second and third resistors connected, respectively, between said first input terminal and said second output terminal and said second input terminal and said first output terminal to form, respectively, the third and fourth arms of said bridge network, said current sensitive resistor having a resistance such that said bridge network is normally unbalanced in the absence of a signal supplied thereto, said current sensitive resistor having a resistance-current characteristic such that said bridge network approaches balance as energy is supplied to said input terminals, the rate of change of resistance of said current sensitive resistor being slow compared to the rate of change of impedance of said photo-conductive cell resulting from said fluctuation of the light supplied thereto, a first amplifier having a restricted passband, means connecting the input of said first amplifier to said output terminals of said bridge network, a signal adding circuit connected to the output of said amplifier, means connected to said adding circuit for supplying thereto a signal having a frequency outside the passband of said first amplifier, means connecting the output of said adding circuit to said input terminals of said bridge network thereby to form a closed, self-oscillatory loop, a second amplifier having a restricted passband, said second amplifier being connected to said output terminals of said bridge network and arranged to pass only signals having frequencies corresponding to the frequency of said signal supplied to said adding circuit and modulation sidebands thereof resulting from the fluctuation of the impedance of said photo-conductive cell, and detector means connected to the output of said second amplifier and arranged to detect the modulation envelope of signals passed thereby.

11. Means for measuring the variation of impedance of a circuit element comprising a bridge network including said circuit element, an amplifier connected from the output of said bridge network to the input thereof, thereby to form a closed, self-oscillatory loop, said bridge network being so arranged that it is unbalanced at the no signal level and approaches balance as the level of the self-oscillatory signal increases, the rate at which said bridge approaches balance being slow compared to the variation in impedance to be measured, and means coupled to the output of said bridge circuit for detecting the variation in amplitude of a signal appearing thereat resulting from said variation in impedance of said circuit element.

12. Means for measuring the variation of impedance of a circuit element comprising a bridge network including said circuit element, an amplifier connected from the output of said bridge network to the input thereof, thereby to form a closed self-oscillatory loop, said bridge network being so arranged that it is unbalanced at the no signal level, means included in said bridge circuit and responsive to changes in amplitude of said self-oscillatory signal for causing said bridge to approach balance, the rate at which said bridge approaches balance being slow relative to the variation in impedance to be measured, and means coupled to the output of said bridge network for detecting the variation in amplitude of a signal appearing thereat as a result of unbalances in said bridge network resulting from said relatively rapid variation in the impedance of said circuit element.

13. An impedance measuring means according to claim 12 wherein said detector means is arranged to measure the variations in amplitude of said self-oscillatory signal.

14. An impedance measuring means according to claim 12, said means further comprising means for supplying a second signal to the input of said bridge network at a frequency displaced from that of said self-oscillatory signal, said means for measuring the variation in amplitude of the signal at the output of said bridge being responsive only to signals at approximately the frequency of said supplied signal.

References Cited by the Examiner
UNITED STATES PATENTS

| | | | |
|---|---|---|---|
| 2,565,922 | 8/1951 | Howard | 324—57 |
| 2,623,929 | 12/1952 | Moody et al. | 324—57 |

WALTER L. CARLSON, *Primary Examiner.*

CHESTER L. JUSTUS, E. E. KUBASIEWICZ,
*Examiners*